(12) United States Patent
Yamada et al.

(10) Patent No.: US 10,675,788 B2
(45) Date of Patent: Jun. 9, 2020

(54) METHOD FOR PRODUCING MOLD (71) Applicants: Sharp Kabushiki Kaisha, Sakai, Osaka (JP); GEOMATEC CO., LTD., Yokohama-shi, Kanagawa (JP)

(72) Inventors: Nobuaki Yamada, Osaka (JP); Kiyoshi Minoura, Osaka (JP); Miho Yamada, Osaka (JP); Hidekazu Hayashi, Osaka (JP); Takashi Satoh, Osaka (JP); Hiroyuki Sugawara, Miyagi (JP)

(73) Assignees: SHARP KABUSHIKI KAISHA, Osaka (JP); GEOMATEC CO., LTD., Kanagawa (JP)

( * ) Notice: Subject to any disclaimer, the term of this patent is extended or adjusted under 35 U.S.C. 154(b) by 241 days.

(21) Appl. No.: 15/525,714

(22) PCT Filed: Nov. 6, 2015

(86) PCT No.: PCT/JP2015/081396
§ 371 (c)(1),
(2) Date: May 10, 2017

(87) PCT Pub. No.: WO2016/076239
PCT Pub. Date: May 19, 2016

(65) Prior Publication Data
US 2018/0326624 A1 Nov. 15, 2018

(30) Foreign Application Priority Data
Nov. 12, 2014 (JP) .................................. 2014-229929

(51) Int. Cl.
*B29C 33/38* (2006.01)
*C25D 11/12* (2006.01)
(Continued)

(52) U.S. Cl.
CPC ............ *B29C 33/38* (2013.01); *B29C 33/424* (2013.01); *B29C 39/148* (2013.01); *B29C 39/26* (2013.01);
(Continued)

(58) Field of Classification Search
CPC ..... B29C 33/424; B29C 39/148; B29C 39/26; B29C 33/42; B29C 59/046;
(Continued)

(56) References Cited

U.S. PATENT DOCUMENTS 6,359,735 B1 3/2002 Gombert et al.
2003/0205475 A1 11/2003 Sawitowski
(Continued)

FOREIGN PATENT DOCUMENTS

JP 2001/517319 A 10/2001
JP 20031531962 A 10/2003
(Continued)

OTHER PUBLICATIONS

Epitaxial Growth of Cu Nanodot Arrays Using an AAO Template on a Si Substrate, Electrochemical and Solid-State Letters, 9(4), J13-J16, 2006 (Year: 2006).*

(Continued)

*Primary Examiner* — Xiuyu Tai
(74) *Attorney, Agent, or Firm* — Harness, Dickey & Pierce, P.L.C.

(57) ABSTRACT

A manufacturing method of a mold, the mold having at its surface a plurality of recessed portions whose two-dimensional size is not less than 10 nm and less than 500 nm when viewed in a direction normal to the surface, the method including: (a) providing a mold base, (b) partially anodizing an aluminum alloy layer, thereby forming a porous alumina layer which has a plurality of minute recessed portions; and (c) after step (b), bringing the porous alumina layer into (Continued)

contact with a first etching solution, thereby enlarging the plurality of minute recessed portions of the porous alumina layer. Step (a) of providing the mold base includes (a1) providing a metal base, (a2) forming an aluminum alloy layer on the metal base, and (a3) forming a surface protection layer on the aluminum alloy layer. Step (a2) and step (a3) are performed in a same chamber.

12 Claims, 5 Drawing Sheets (51) Int. Cl.
| | | |
|---|---|---|
| C25D 11/24 | (2006.01) | |
| G02B 1/118 | (2015.01) | |
| C25D 11/00 | (2006.01) | |
| B29C 39/26 | (2006.01) | |
| C23C 28/00 | (2006.01) | |
| B29C 39/14 | (2006.01) | |
| B29C 33/42 | (2006.01) | |
| H04M 1/02 | (2006.01) | |
| G02B 1/10 | (2015.01) | |

(52) U.S. Cl.
CPC .............. *C23C 28/00* (2013.01); *C23C 28/32* (2013.01); *C23C 28/3455* (2013.01); *C25D 11/005* (2013.01); *C25D 11/12* (2013.01); *C25D 11/24* (2013.01); *G02B 1/118* (2013.01); *G02B 1/10* (2013.01); *H04M 1/0266* (2013.01)

(58) Field of Classification Search
CPC . B29C 2035/0827; C23C 28/00; C23C 28/32; C23C 28/3455; C23C 14/0617; C25D 11/005; C25D 11/12; C25D 11/24; C25D 11/04; C25D 11/045; C25D 1/10; G02B 1/118; G02B 1/10; H04M 1/0266; C04B 35/581; H01L 21/0332; H01L 21/32139; H01L 21/02178; H01L 21/02266; H01L 21/0254; H01L 21/02573; H01L 21/02631
See application file for complete search history.

(56) References Cited

U.S. PATENT DOCUMENTS

| | | |
|---|---|---|
| 2007/0159698 A1 | 7/2007 | Taguchi et al. |
| 2012/0318772 A1 | 12/2012 | Minoura et al. |
| 2013/0004612 A1 | 1/2013 | Isurugi et al. |
| 2013/0296158 A1* | 11/2013 | Cao .................. H01L 21/0332 501/98.4 |
| 2014/0197036 A1* | 7/2014 | Isurugi .................. B29C 33/38 205/112 |
| 2015/0140154 A1 | 5/2015 | Isurugi et al. |

FOREIGN PATENT DOCUMENTS

| | | | |
|---|---|---|---|
| JP | 2009/166502 A | 7/2009 | |
| JP | 2014/071312 A | 4/2014 | |
| JP | 2014/113710 A | 6/2014 | |
| WO | WO-2011/105206 A1 | 9/2011 | |
| WO | WO-2011/125486 A1 | 10/2011 | |
| WO | WO2012137664 | * 10/2012 | ............ B29C 33/38 |
| WO | WO-2013/183576 A1 | 12/2013 | |

OTHER PUBLICATIONS

International Search Report PCT/ISA/210 for International Application No. PCT/JP2015/081396 dated Dec. 22, 2015.

* cited by examiner

# METHOD FOR PRODUCING MOLD

TECHNICAL FIELD

The present invention relates to a mold manufacturing method and, for example, to a method for manufacturing a mold whose surface has an inverted moth-eye structure. In this specification, the "mold" includes molds that are for use in various processing methods (stamping and casting), and is sometimes referred to as a stamper. The "mold" can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a microscopic uneven pattern in which the interval of recessed portions or raised portions is not more than the wavelength of visible light ($\lambda$=380 nm to 780 nm). See Patent Documents 1 to 3. The two-dimensional size of a raised portion of an uneven pattern which performs an antireflection function is not less than 10 nm and less than 500 nm. Here, the "two-dimensional size" of the raised portions refers to the area equivalent circle diameter of the raised portions viewed in a direction normal to the surface. For example, when the raised portions have a conical shape, the two-dimensional size of the raised portions is equivalent to the diameter of the base of the cone. The same applies to the "two-dimensional size" of the recessed portions.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby, for example, reflection of the visible light band is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

The present applicant has developed a method of producing an antireflection film (or antireflection surface) which has a moth-eye structure with the use of an anodized porous alumina layer obtained by anodization of aluminum (Patent Documents 2 to 5).

Utilizing an anodized porous aluminum film can facilitate the manufacture of a mold which is used for formation of a moth-eye structure over a surface (hereinafter, "moth-eye mold"). In particular, as described in Patent Documents 2 to 5, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

The entire disclosures of Patent Documents 1 to 5 are incorporated by reference in this specification.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2009-166502
Patent Document 4: WO 2011/125486
Patent Document 5: WO 2013/183576
Patent Document 6: Japanese Laid-Open Patent Publication No. 2014-113710
Patent Document 7: Japanese Laid-Open Patent Publication No. 2014-71312

SUMMARY OF INVENTION

Technical Problem

The present inventors produced antireflection films using a moth-eye mold and encountered such a problem that some of the antireflection films had defects ranging in size from 200 µm to 3 mm. When such an antireflection film is placed over a display, for example, some of images viewed through the antireflection film were distorted. Details of this defect will be described later.

The present invention was conceived in order to solve the above-described problems. The major objects of the present invention include providing a mold manufacturing method which is capable of improving the production yield of a film whose surface has a moth-eye structure.

Solution to Problem

A mold manufacturing method of an embodiment of the present invention is a manufacturing method of a mold, the mold having at its surface a plurality of recessed portions whose two-dimensional size is not less than 10 nm and less than 500 nm when viewed in a direction normal to the surface, the method including: (a) providing a mold base, step (a) including (a1) providing a metal base, (a2) forming an aluminum alloy layer on the metal base, and (a3) forming a surface protection layer on the aluminum alloy layer; (b) partially anodizing the aluminum alloy layer, thereby forming a porous alumina layer which has a plurality of minute recessed portions; and (c) after step (b), bringing the porous alumina layer into contact with a first etching solution, thereby enlarging the plurality of minute recessed portions of the porous alumina layer, wherein step (a2) and step (a3) are performed in a same chamber.

In one embodiment, step (a2) includes forming the aluminum alloy layer by physical vapor deposition using a first source material which contains aluminum, and step (a3) includes forming the surface protection layer by physical vapor deposition using a second source material which contains a material contained in the first source material.

In one embodiment, the first source material and the second source material are same materials.

In one embodiment, step (a3) includes forming the surface protection layer by physical vapor deposition which is performed with an oxygen gas or a nitrogen gas introduced into a chamber.

In one embodiment, the surface protection layer contains aluminum and either of oxygen or nitrogen.

In one embodiment, step (a) further includes (a4) bringing the surface protection layer into contact with a second etching solution, thereby removing the surface protection layer, and an etching rate in the second etching solution of the surface protection layer is higher than an etching rate in the second etching solution of the aluminum alloy layer.

In one embodiment, the etching rate in the second etching solution of the surface protection layer is not less than 10 times the etching rate in the second etching solution of the aluminum alloy layer. For example, when the thickness of the surface protection layer is about 1 μm and the size of an attached object is not more than 100 μm, the etching rate in the second etching solution of the surface protection layer is preferably not less than 10 times the etching rate in the second etching solution of the aluminum alloy layer.

In one embodiment, the first etching solution and the second etching solution contain a same acid.

In one embodiment, the first etching solution and the second etching solution are same etching solutions.

In one embodiment, step (a) further includes (a5) after step (a1) and before step (a2), forming an inorganic underlayer on the metal base.

In one embodiment, step (a2), step (a3) and step (a5) are performed in a same chamber.

In one embodiment, the method further includes (d) after step (c), further performing anodization to grow the plurality of minute recessed portions.

In one embodiment, step (b) and step (c) are further performed after step (d).

Advantageous Effects of Invention

According to an embodiment of the present invention, a mold can be manufactured which is capable of, for example, improving the production yield of a film whose surface has a moth-eye structure.

DESCRIPTION OF EMBODIMENTS

Firstly, the causes of defects in the antireflection film which were found by the present inventors are described with reference to FIG. 3 to FIG. 5.

The surface of a moth-eye mold 200 (hereinafter, also referred to as "comparative example moth-eye mold"), which caused the defects in the antireflection film, was examined. FIG. 3(a) is a SEM image of a portion of the surface of the moth-eye mold 200 corresponding to a defect in an antireflection film, which was observed using a scanning electron microscope (SEM). FIG. 3(b) is a SEM image of a cross section of the portion of the surface of the moth-eye mold 200 corresponding to the defect in the antireflection film. FIG. 3(c) is a graph showing the result of a composition analysis of the attached object at an encircled portion of FIG. 3(b) with the use of an energy-dispersive X-ray spectrometer (EDS). The energy-dispersive X-ray spectrometer used in the composition analysis was JED-2200 manufactured by JEOL Ltd.

Figure 3:
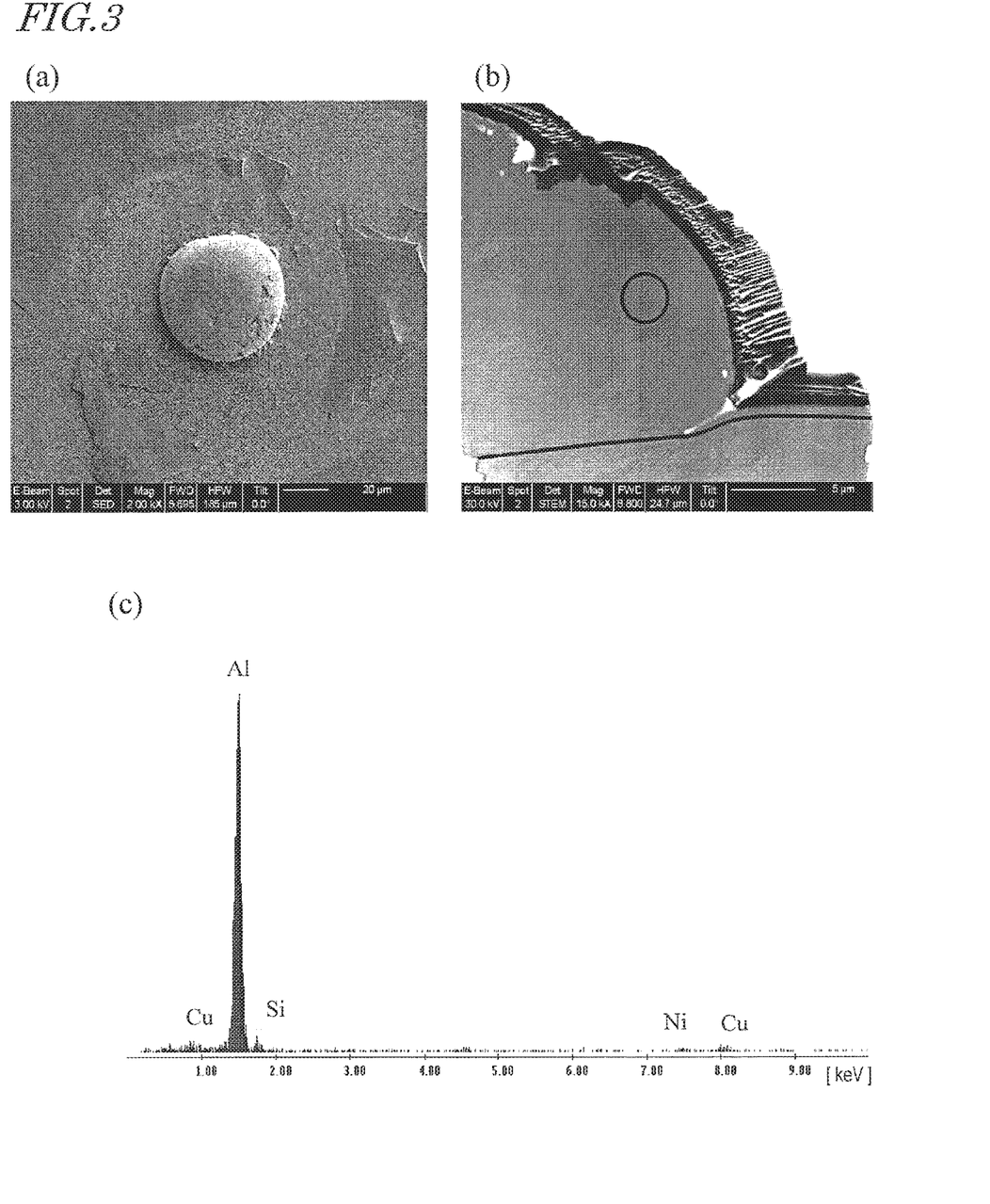
[FIG. 3] (a) is an image of a portion of the surface of a comparative example moth-eye mold 200 corresponding to a defect in an antireflection film, which was observed using a scanning electron microscope (SEM). (b) is a SEM image of a cross section of the portion of the surface of the moth-eye mold 200 corresponding to the defect in the antireflection film. (c) is a graph showing the result of a composition analysis of an attached object at an encircled portion of (b).

As shown in FIG. 3(a) and FIG. 3(b), it was found that a portion of the surface of the moth-eye mold 200 corresponding to the defect in the antireflection film had an attached object in the shape of a deformed sphere (e.g., a circular zabuton cushion shape). As seen from FIG. 3(a), the size of the attached object was several tens of micrometers (μm). For example, in the example shown in FIG. 3(a), the size of the attached object was about 60 μm. Here, the size of the attached object refers to the area equivalent circle diameter of the attached object viewed in a direction normal to the surface of the moth-eye mold. In the antireflection film, a defect occurred over a range of 200 μm to 3 mm. Therefore, it was found that the size of the defect was several tens to several hundreds of times greater than the size of the attached object.

The following problem occurs due to the size of the defect in the antireflection film which is several tens to several hundreds of times greater than the size of the attached object on the surface of the moth-eye mold. When the moth-eye mold that has an attached object on the surface is used to produce an antireflection film, there is a probability that a defect occurs over a range of several hundreds of micrometers (μm) to several millimeters (mm). The defect occurring over this range is perceived by an observer's eye and, thus, the antireflection film can be a defective product. Meanwhile, the size of the attached object is several tens of micrometers (μm) and, thus, it is difficult to find the attached object by visual inspection across the surface of the moth-eye mold before production of the antireflection film. Therefore, it is difficult to suppress the decrease in the production yield of the antireflection film.

The mechanism of occurrence of a defect in an antireflection film, which is attributed to the attached object on the surface of the moth-eye mold, produced with the use of the mold, over a range of several tens to several hundreds of times greater than the attached object is described with reference to FIG. 4. FIG. 4(a) to FIG. 4(c) are schematic cross-sectional views for illustrating occurrence of a defect in an antireflection film which is produced using the comparative example moth-eye mold 200.

Figure 4:
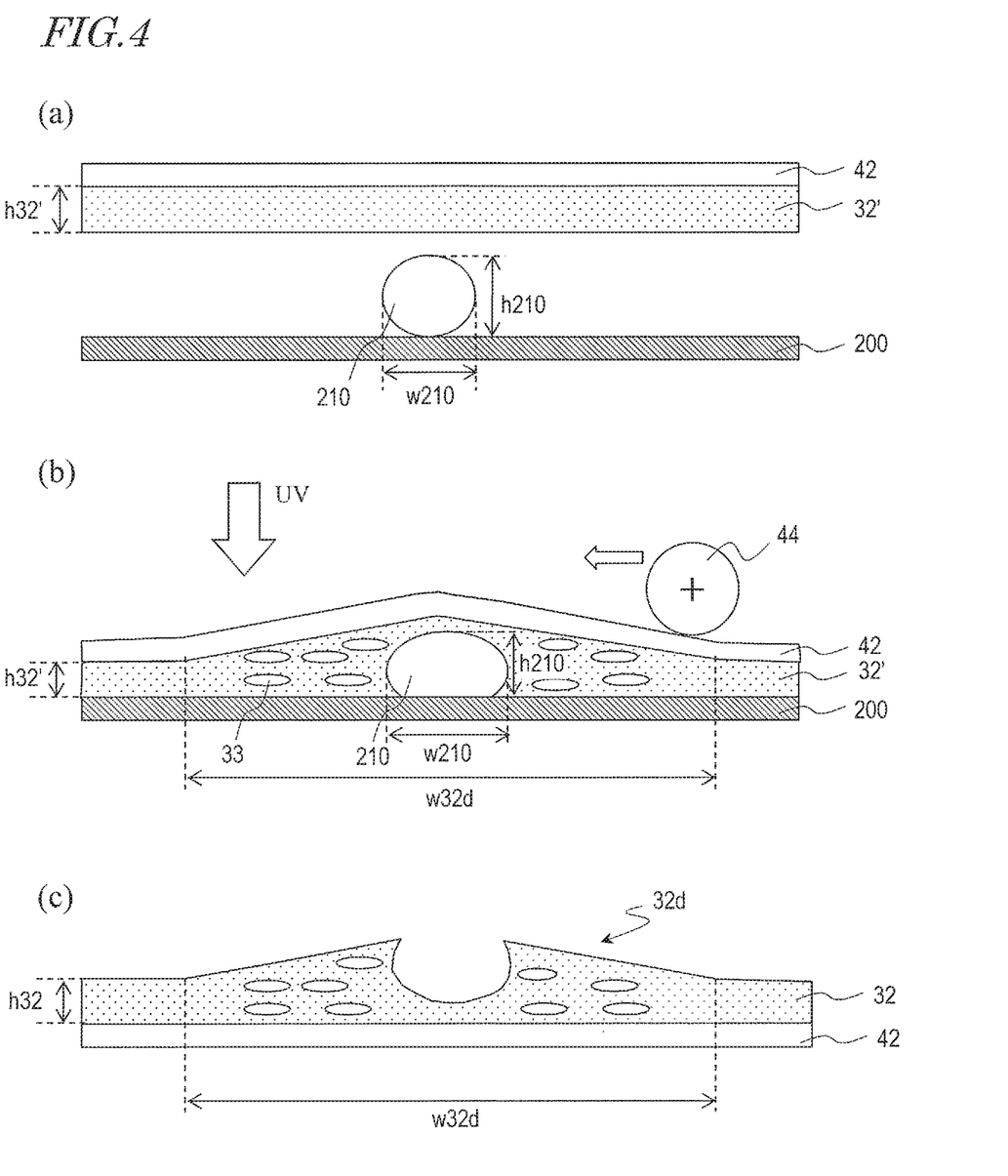
[FIG. 4] (a) to (c) are schematic cross-sectional views for illustrating occurrence of a defect in an antireflection film which is produced using the comparative example moth-eye mold 200.

As shown in FIG. 4(a), for the purpose of producing an antireflection film, the moth-eye mold 200 and a work 42 which has a UV-curable resin 32' over its surface are provided. The moth-eye mold 200 has an inverted moth-eye structure over the surface.

The surface of the moth-eye mold 200 has one or a plurality of attached objects 210. When an attached object 210 attaches to the surface of the moth-eye mold 200, the shape of the attached object 210 is, for example, generally spherical as shown in FIG. 4(a). The shape of the attached object 210 can be generally spherical before the step of pressing the work 42 against the moth-eye mold 200 which will be described with reference to FIG. 4(b). The UV-curable resin 32' is applied to, for example, the surface of the work 42. The UV-curable resin 32' applied over the surface of the work 42 has a generally constant thickness h32'. The height h210 of the attached object 210 is, for example, greater than the thickness h32' of the UV-curable resin 32'. Here, the height h210 of the attached object 210 refers to a height in a direction normal to the surface of the moth-eye mold 200. The thickness h32' of the UV-curable resin 32' refers to a thickness in a direction normal to the surface of the work 42 (or the moth-eye mold 200). The size w210 of the attached object 210 is, for example, 20 µm to 200 µm.

As shown in FIG. 4(b), the work 42 which has the UV-curable resin 32' over its surface is maintained pressed against the moth-eye mold 200, and the UV-curable resin 32' is irradiated with ultraviolet (UV) light such that the UV-curable resin 32' is cured. Here, since the height h210 of the attached object 210 is greater than the thickness h32' of the UV-curable resin 32' (see FIG. 4(a)), the UV-curable resin 32' has a greater thickness in a region of the size w32d with the attached object 210 at its center than in the surrounding region. The thickness h32' of the UV-curable resin 32' (see FIG. 4(b)) in the surrounding region is generally equal to the thickness h32' of the UV-curable resin 32' shown in FIG. 4(a). Such an uneven thickness of the UV-curable resin 32' which is attributed to the attached object 210 causes a defect 32d in the region of the size w32d in a produced antireflection film 32 as shown in FIG. 4(c). The size w32d of the defect 32d is several tens to several hundreds of times greater than the size w210 of the attached object 210. The size w32d of the defect 32d refers to the area equivalent circle diameter of the defect 32d viewed in a direction normal to the antireflection film 32.

For example, a pinch roller 44 can be used to press the work 42 against the moth-eye mold 200. The UV-curable resin 32' used can be, for example, an acrylic resin. The work 42 may be, for example, a TAC (triacetyl cellulose) film.

When the work 42 is pressed against the moth-eye mold 200, the attached object 210 can have the shape of a deformed sphere. In the step illustrated in FIG. 4(b), the height h210 of the attached object 210 can be smaller and the size w210 of the attached object 210 can be greater than in the step illustrated in FIG. 4(a). Note that, however, also in the step illustrated in FIG. 4(b), the height h210 of the attached object 210 is greater than the thickness h32' of the UV-curable resin 32'. When the work 42 is pressed against the moth-eye mold 200, a crack sometimes appears in the surface of the attached object 210 as shown in FIG. 3(a). The crack can be, for example, streaky in the surface of the attached object 210. For example, when the height h210 of the attached object 210 is large, bubbles 33 occur in the UV-curable resin 32' around the attached object 210.

Thereafter, as shown in FIG. 4(c), the moth-eye mold 200 is separated from the work 42, whereby a cured material layer (antireflection film) 32 to which the uneven structure of the moth-eye mold 200 (inverted moth-eye structure) is transferred is formed on the surface of the work 42. In the antireflection film 32, the defect 32d occurs over the region of the size w32d. At the defect 32d, the thickness of the film is greater than in the surrounding region. The defect 32d has, for example, a lens-like shape. When the antireflection film 32 is placed over the display surface of a display, for example, an image viewed through the antireflection film 32 can be distorted due to the defect 32d. The thickness h32 of the antireflection film 32 in a region surrounding the defect 32d is generally equal to the thickness h32' of the UV-curable resin 32' shown in FIG. 4(a).

The term "defect" used in this specification as for a film (e.g., antireflection film), such as the defect 32d described above, includes a condition that a portion of the film has a greater thickness than its surrounding portion of the film. When a film which has such a defect is placed over the display surface of a display, for example, an image viewed through the defect portion can sometimes be distorted.

Next, the present inventors carried out research concerning where in the manufacturing process of the moth-eye mold 200 the attached object 210 occurred. The research is described with reference to FIG. 5. FIGS. 5(a) and 5(b) are schematic cross-sectional views for illustrating a manufacturing method of a comparative example moth-eye mold 200. The comparative example moth-eye mold 200 can be manufactured by a method disclosed in Patent Documents 2 to 5.

Figure 5:
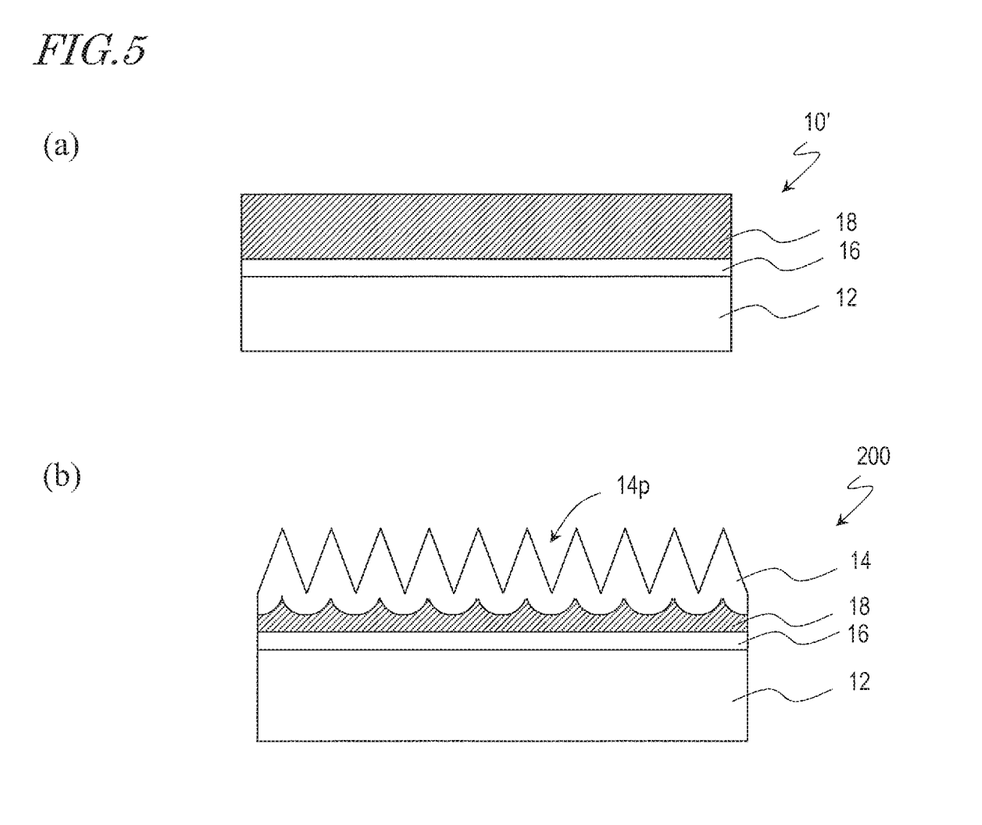
[FIG. 5] (a) and (b) are schematic cross-sectional views for illustrating a manufacturing method of the comparative example moth-eye mold 200.

The method for manufacturing the comparative example moth-eye mold 200 includes the following steps, Step (A') to Step (C'), as illustrated in FIGS. 5(a) and 5(b).

Step (A'): Providing a mold base 10 which includes a metal base 12, an inorganic underlayer 16 formed on the metal base 12, and an aluminum alloy layer 18 deposited on the inorganic underlayer 16.

Step (B'): Partially anodizing the aluminum alloy layer 18 to form a porous alumina layer 14 which has a plurality of micro recessed portions 14p.

Step (C'): After Step (B'), bringing the porous alumina layer 14 into contact with an etching solution (which will also be referred to as "first etching solution" in the following), thereby enlarging the plurality of micro recessed portions 14p of the porous alumina layer 14.

The present inventors analyzed the constituents of the attached object 210 and found that, as seen from FIG. 3(c), aluminum (Al) is the major constituent, and the attached object 210 has the same constituents as those of the aluminum alloy layer 18. Also, as seen from FIG. 3(b), the surface of the attached object 210 has a porous alumina layer which has an inverted moth-eye structure. It is estimated from these findings that the attached object 210 occurred after formation of the aluminum alloy layer 18 at the surface of the moth-eye mold 200 and before the anodization step (i.e., after Step (A') and before Step (B')). The formation of the aluminum alloy layer 18 is carried out by, for example, sputtering in a chamber (vacuum chamber). It is estimated that, in the step of opening the chamber to the air for taking out a mold base 10' from the chamber after an aluminum alloy is deposited to form the aluminum alloy layer 18, a clod (particle) of the aluminum alloy in the chamber attaches to the surface of the aluminum alloy layer 18, resulting in occurrence of the attached object 210.

The attached object 210 occurring on the surface of the aluminum alloy layer 18 has the same composition as that of the aluminum alloy layer 18 and therefore has high adhesion to the aluminum alloy layer 18. The problem of difficulty in removing the attached object 210 arises. Even when the surface of the moth-eye mold 200 is washed before the anodization step, it is difficult to thoroughly remove the attached object 210. The adhesion between the attached object 210 and the aluminum alloy layer 18 can be further enhanced by the step of pressing the work 42 against the moth-eye mold 200 which has previously been described with reference to FIG. 4(*b*).

To manufacture a mold for formation of a moth-eye structure which has regularly-arranged raised portions, for example, the step of forming a porous alumina layer which has a thickness of, for example, about 0.1 μm to 0.3 μm and thereafter removing the formed porous alumina layer by etching may be performed between Step (A') and Step (B'). This is because, when a porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Even when the above-described step is further performed, it is difficult to substantially thoroughly remove the attached object 210 because the attached object 210 has the same composition as that of the aluminum alloy layer 18.

Hereinafter, mold manufacturing methods of embodiments of the present invention will be described with reference to the drawings. A mold of the present embodiment is a mold which has over its surface a plurality of recessed portions whose two-dimensional size viewed in the normal direction of the surface is not less than 10 nm and less than 500 nm. A mold of an embodiment of the present invention is a moth-eye mold which has, for example, an inverted moth-eye structure over its surface. The moth-eye mold 200 may be in the shape of a hollow cylinder or may be in the shape of a plate. Particularly as disclosed in WO 2011/105206 of the present applicant, when a moth-eye mold in the shape of a hollow cylinder is used, the antireflection film can be efficiently produced according to a roll-to-roll method. The entire disclosure of WO 2011/105206 is incorporated by reference in this specification. Note that the present invention is not limited to the embodiments which will be described in the following sections. In the drawings mentioned in the following sections, components which have substantially the same functions are designated by the same reference numerals, and the descriptions thereof are sometimes omitted.

Embodiment 1

A mold manufacturing method of Embodiment 1 of the present invention includes the following steps, Step (A) to Step (C).

Step (A): Providing a mold base, including (A1) providing a metal base, (A2) forming an aluminum alloy layer on the metal base, and (A3) forming a surface protection layer on the aluminum alloy layer. Here, Step (A2) and Step (A3) are performed in the same chamber. Step (A) further includes (A4) bringing the surface protection layer into contact with a second etching solution, thereby removing the surface protection layer.

Step (B): Partially anodizing the aluminum alloy layer to form a porous alumina layer which has a plurality of minute recessed portions.

Step (C): After Step (B), bringing the porous alumina layer into contact with a first etching solution, thereby enlarging the plurality of minute recessed portions of the porous alumina layer.

According to the mold manufacturing method of Embodiment 1 of the present invention, a surface protection layer is formed on an aluminum alloy layer, and formation of the surface protection layer is performed in the same chamber as that used for formation of the aluminum alloy layer. Therefore, occurrence of an attached object which is in direct contact with the aluminum alloy layer can be suppressed. Since attached objects occur on the surface protection layer that has a different composition from that of the aluminum alloy layer, it is possible to easily remove the attached objects. The decrease in the production yield of a film produced with the use of the mold can be suppressed.

Figure 1:
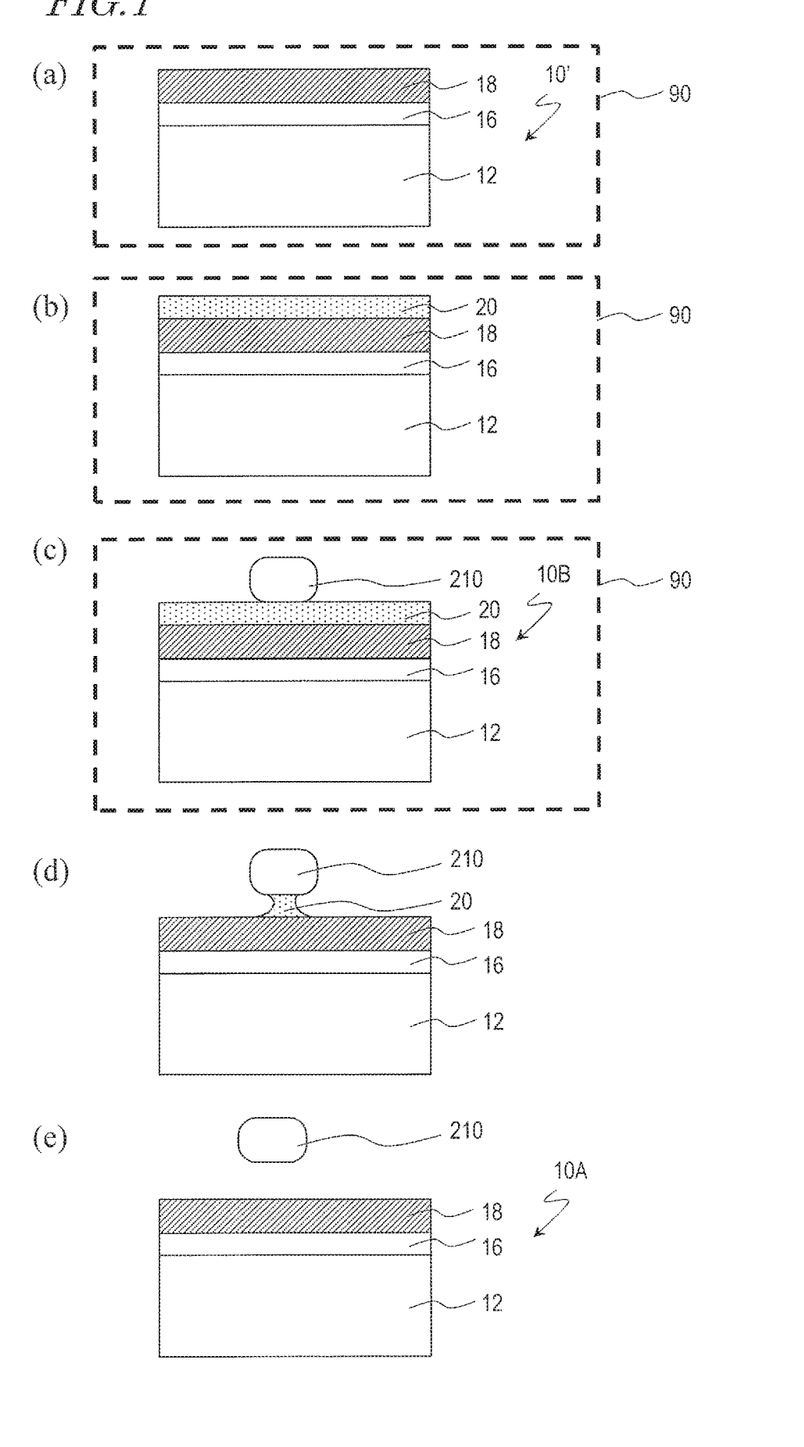
[FIG. 1] (a) to (e) are cross-sectional views for illustrating a manufacturing method of a mold base 10A for use in manufacture of a moth-eye mold 100 of Embodiment 1 of the present invention.

Next, a mold manufacturing method of Embodiment 1 of the present invention and the configuration of a mold manufactured by the manufacturing method are specifically described with reference to FIG. 1 and FIG. 2. FIG. 1(*a*) to FIG. 1(*e*) and FIG. 2(*a*) to FIG. 2(*e*) are schematic cross-sectional views for illustrating a manufacturing method of a moth-eye mold 100 of Embodiment 1 of the present invention.

Firstly, a method for manufacturing a mold base 10A that is for use in manufacture of the moth-eye mold 100 of Embodiment 1 of the present invention is described with reference to FIG. 1(*a*) to FIG. 1(*e*).

As shown in FIG. 1(*a*), a mold base 10' is provided which includes a metal base 12 and an aluminum alloy layer 18 formed on the metal base 12. The mold base 10' is the same as, for example, the mold base 10' of the comparative example moth-eye mold 200. The step of providing the mold base 10' which will be described in the following may be the same as, for example, the step of providing the mold base 10' of the comparative example moth-eye mold 200.

As illustrated in FIG. 1(*a*), the mold base 10' may further include an inorganic underlayer 16 between the metal base 12 and the aluminum alloy layer 18. The mold manufacturing method of Embodiment 1 may further include the step of forming the inorganic underlayer 16 on the metal base 12 after the step of providing the metal base 12 and before the step of forming the aluminum alloy layer 18.

The metal base 12 used can be an aluminum base 12 whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum alloy layer 18 and the aluminum base 12 in a portion in which the abrasive particles are present. Not only in the portion in which the abrasive particles are remaining but also in a portion which has a roughened surface, conduction readily occurs between the aluminum alloy layer 18 and the aluminum base 12. When conduction occurs locally between the aluminum alloy layer 18 and the aluminum base 12, there is a probability that a local cell reaction will occur between an impurity in the aluminum base 12 and the aluminum alloy layer 18.

The material of the inorganic underlayer 16 may be, for example, tantalum oxide ($Ta_2O_5$) or silicon dioxide ($SiO_2$). The inorganic underlayer 16 can be formed by, for example, sputtering in a chamber 90. When a tantalum oxide layer is used as the inorganic underlayer 16, the thickness of the tantalum oxide layer is, for example, 200 nm.

The thickness of the inorganic underlayer 16 is preferably not less than 100 nm and less than 500 nm. If the thickness of the inorganic underlayer 16 is less than 100 nm, there is a probability that a defect (typically, a void; i.e., a gap between crystal grains) occurs in the aluminum alloy layer 18. If the thickness of the inorganic underlayer 16 is not less than 500 nm, insulation is likely to occur between the aluminum base 12 and the aluminum alloy layer 18 due to the surface condition of the aluminum base 12. To realize anodization of the aluminum alloy layer 18 by supplying an electric current from the aluminum base 12 side to the aluminum alloy layer 18, the electric current needs to flow between the aluminum base 12 and the aluminum alloy layer 18. When employing a configuration where an electric current is supplied from the inside surface of the aluminum base 12 in the shape of a hollow cylinder, it is not necessary to provide an electrode to the aluminum alloy layer 18. Therefore, the aluminum alloy layer 18 can be anodized across the entire surface, while such a problem does not occur that supply of the electric current becomes more difficult as the anodization advances. Thus, the aluminum alloy layer 18 can be anodized uniformly across the entire surface.

To form a thick inorganic underlayer 16, it is in general necessary to increase the film formation duration. When the film formation duration is increased, the surface temperature of the aluminum base 12 unnecessarily increases, and as a result, the film quality of the aluminum alloy layer 18 deteriorates, and a defect (typically, a void) occurs in some cases. When the thickness of the inorganic underlayer 16 is less than 500 nm, occurrence of such a problem can be suppressed.

The aluminum alloy layer 18 is, for example, a film which is made of aluminum whose purity is not less than 99.99 mass % (hereinafter, sometimes referred to as "high-purity aluminum film") as disclosed in Patent Document 4. The aluminum alloy layer 18 is formed by, for example, vacuum deposition or sputtering in the chamber 90. The thickness of the aluminum alloy layer 18 is preferably in the range of not less than about 500 nm and not more than about 1500 nm. For example, the thickness of the aluminum alloy layer 18 is about 1 μm.

The aluminum alloy layer 18 may be an aluminum alloy film disclosed in Patent Document 5 in substitution for the high-purity aluminum film. The aluminum alloy film disclosed in Patent Document 5 contains aluminum, a metal element other than aluminum, and nitrogen. In this specification, the "aluminum film" includes not only the high-purity aluminum film but also the aluminum alloy film disclosed in Patent Document 5.

Using the above-described aluminum alloy film enables to obtain a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Then, a surface protection layer 20 is formed on the aluminum alloy layer 18 of the mold base 10' as shown in FIG. 1(b). Formation of the surface protection layer 20 is performed in the same chamber 90 as that used for formation of the aluminum alloy layer 18.

Since formation of the surface protection layer 20 is performed in the same chamber 90 as that used for formation of the aluminum alloy layer 18, occurrence of an attached object which is in direct contact with the aluminum alloy layer 18 can be suppressed without increasing the manufacturing steps. After the aluminum alloy layer 18 is formed, the surface protection layer 20 is preferably formed without taking out the mold base 10' from the chamber 90. For example, it is preferred that during the interval between formation of the aluminum alloy layer 18 and formation of the surface protection layer 20 the vacuum degree in the chamber 90 is maintained at not more than $1 \times 10^{-3}$ Pa. For example, it is preferred that the chamber 90 is not opened to the air during the interval between formation of the aluminum alloy layer 18 and formation of the surface protection layer 20.

The surface protection layer 20 is formed by, for example, sputtering. As the target material of the surface protection layer 20, for example, a material which includes a material included in the source material (including the target material) of the aluminum alloy layer 18 can be used.

In this specification, the source material refers to a source material for use in physical vapor deposition (PVD). The physical vapor deposition (PVD) includes sputtering and vacuum deposition. Particularly, a source material for use in sputtering is also referred to as "target material".

The target material of the surface protection layer 20 may be the same as the source material of the aluminum alloy layer 18. By performing reactive sputtering with a sputtering gas (e.g., Ar gas) and a reactive gas introduced into the chamber 90, the surface protection layer 20, which has a different composition from that of the aluminum alloy layer 18, can be formed using the same source material as the source material of the aluminum alloy layer 18. As the reactive gas, for example, an oxygen gas and/or a nitrogen gas can be used. When the aluminum alloy layer 18 was formed by sputtering, only the reactive gas may be further introduced into the chamber 90 in formation of the surface protection layer 20 because the sputtering gas has already been introduced into the chamber 90.

The surface protection layer 20 contains, for example, aluminum and oxygen and/or nitrogen. The surface protection layer 20 contains, for example, an aluminum oxide (including $Al_2O_3$ and $Al_xO_y$ in which the ratio between Al and O (composition ratio) is deviated from 2:3) or an aluminum nitride (including AlN and $Al_xN_y$ in which the ratio between Al and N (composition ratio) is deviated from 1:1). The thickness of the surface protection layer 20 is, for example, 5 nm to 500 nm. The thickness of the surface protection layer 20 may be, for example, 100 nm to 300 nm. From the viewpoint of weakening the adhesion between the aluminum alloy layer 18 and the attached object 210, the thickness of the surface protection layer 20 is preferably not less than 50 nm. From the viewpoint of reducing the time required for formation and/or etching of the surface protection layer 20, the thickness of the surface protection layer 20 is preferably not more than 500 nm.

The step of forming the surface protection layer 20 may be performed in such a manner that the volume fraction of the reactive gas to the total gas volume varies continuously or discontinuously as the process of sputtering advances. Here, "the volume fraction of the reactive gas to the total gas volume" is (REACTIVE GAS FLOW RATE/(SPUTTERING GAS FLOW RATE+REACTIVE GAS FLOW RATE)). The volume fraction of the reactive gas to the total gas volume may increase or decrease as the process of sputtering advances. As a matter of course, the volume fraction of the reactive gas to the total gas volume may be generally constant during the process of sputtering.

The surface protection layer 20 contains, for example, aluminum and oxygen and/or nitrogen. The content of aluminum in the surface protection layer 20 may have such a profile that it is higher on the aluminum alloy layer 18 side than on the mold base surface side. The content of aluminum in the surface protection layer 20 may have such a profile that it is lower on the aluminum alloy layer 18 side than on the mold base surface side. The content of aluminum in the surface protection layer 20 may vary continuously or discontinuously.

The method for forming the surface protection layer 20 is not limited to sputtering but may be physical vapor deposition (PVD). The physical vapor deposition includes, for example, sputtering and vacuum deposition. For example, when the surface protection layer 20 is formed by vacuum deposition, the above-described target material of the surface protection layer 20 can be used as the source material of the surface protection layer 20. For example, a reactive deposition can be performed with a reactive gas (e.g., oxygen gas and/or nitrogen gas) introduced into the chamber 90.

The surface protection layer 20 is not limited to the illustrated example layer. The method for forming the surface protection layer 20 is not limited to the illustrated example method. The surface protection layer 20 may be arbitrary, and the surface protection layer 20 can be formed by an arbitrary method, so long as the surface protection layer 20 is capable of preventing occurrence of an attached object which is in direct contact with the aluminum alloy layer 18. As previously described, the surface protection layer 20 preferably meets the following conditions: (1) The surface protection layer 20 is preferably formed in the same chamber 90 as that used for formation of the aluminum alloy layer 18; (2) The chamber 90 is preferably not opened to the air during the interval between formation of the aluminum alloy layer 18 and formation of the surface protection layer 20; (3) The surface protection layer 20 is preferably made of a material which is capable of being etched relatively easily.

When the surface protection layer 20 is formed on the aluminum alloy layer 18, the attached object 210 occurs on the surface protection layer 20 as shown in FIG. 1(c). It is considered that the attached object 210 occurs because, for example, when the chamber 90 is brought back to atmospheric pressure after formation of the surface protection layer 20, the air pressure in the chamber 90 becomes nonuniform (wind occurs) and, a clod (particle) of the source material of the aluminum alloy layer 18 which is present in the chamber 90 for some reasons attaches to the mold base. The mold base shown in FIG. 1(c) is referred to as "mold base 10B". As will be described later, in a mold manufacturing method of Embodiment 2, the mold base 10B is used to manufacture a moth-eye mold.

Then, the mold base 10B is taken out from the chamber 90, and the surface protection layer 20 is brought into contact with a second etching solution, whereby the surface protection layer 20 is removed. Here, for example, the etching rate in the second etching solution of the surface protection layer 20 is higher than the etching rate in the second etching solution of the aluminum alloy layer 18. As shown in FIG. 1(d), the surface protection layer 20 is etched faster than the aluminum alloy layer 18 and, as a result, the surface protection layer 20 is substantially thoroughly removed as shown in FIG. 1(e). By removal of the surface protection layer 20, the attached object 210 on the surface of the surface protection layer 20 is also removed, and a mold base 10A shown in FIG. 1(e) and FIG. 2(a) is obtained. The mold base 10A does not substantially have an attached object 210 on its surface.

For example, the etching rate in the second etching solution of the surface protection layer 20 is preferably not less than 10 times the etching rate in the second etching solution of the aluminum alloy layer 18. For example, when the thickness of the surface protection layer 20 is about 1 μm and the size of the attached object 210 is not more than 100 μm, the etching rate in the second etching solution of the surface protection layer 20 is preferably not less than 10 times the etching rate in the second etching solution of the aluminum alloy layer 18.

The second etching solution is, for example, an acid electrolytic solution. The second etching solution may contain the same acid as that contained in a first etching solution, the details of which will be described later. The second etching solution may be the same etching solution as the first etching solution. When the second etching solution used is the same etching solution as the first etching solution, an increase in the number of steps and/or cost can be suppressed. The second etching solution may be in the same etching bath as that used for the first etching solution or may be in a different etching bath.

To further increase the etching rate in the second etching solution of the surface protection layer 20, for example, the surface protection layer 20 may be configured so as to have a chemically unstable composition. For example, when the surface protection layer 20 is an aluminum oxide, the ratio between Al and O (composition ratio) can be deviated from 2:3 (e.g., deviated to $Al_2O_{(3+\alpha)}$). For example, in the sputtering process for formation of the surface protection layer 20, the oxygen content can be increased by increasing the partial pressure of the oxygen gas (by increasing the flow rate ratio of the oxygen gas to the total gas).

Alternatively, the surface protection layer 20 may be deposited such that the film density of the surface protection layer 20 is low. When the film density of the surface protection layer 20 is low, the etching solution easily comes into the surface protection layer 20, so that the etching rate per volume can be high. The film density can be modified by, for example, appropriately modifying the deposition rate of the surface protection layer 20, the temperature of the base element (the "base element" refers to an element which has a surface on which the surface protection layer 20 is to be formed; e.g., aluminum alloy layer 18), or the partial pressure of the reactive gas.

Patent Document 6 and Patent Document 7 mentioned above disclose mold repairing methods. The mold repairing method of Patent Document 6 includes the foreign object detection step of detecting an foreign object adhering to the surface of a mold and the foreign object removal step of removing the foreign object detected in the foreign object detection step by laser irradiation. Patent Document 6 describes using an atomic-force microscope (AFM) or a scanning electron microscope (SEM) for detection of foreign objects in the mold repairing method of Patent Document 6. The mold repairing method of Patent Document 7 includes the step of filling a defective portion with a repair agent, the step of pressing a repair die against the repair agent, and the step of curing the repair agent by ultraviolet irradiation. The mold repairing methods of Patent Documents 6 and 7 are to address each of foreign objects and defective portions in the mold. Therefore, the mold repairing methods of Patent Documents 6 and 7 cannot be used without the steps of finding a foreign object or defective portion at the surface of the mold and locating the position of that foreign object or defective portion. Further, when the mold repairing method of Patent Document 6 or 7 is used, the steps for repairing of the mold proportionally increase as the number of foreign objects or defective portions in the mold increases.

On the other hand, according to the mold manufacturing method of Embodiment 1 of the present invention, an attached object on a surface can be removed without locating the position of the attached object. Further, a large number of attached objects can be removed at one time. Therefore, even when the number of attached objects increases, the time and/or cost of the step of removing the attached objects do not increase. Irrespective of the number of attached objects, it is possible to remove the attached objects without greatly increasing the manufacturing steps.

The mold base 10A obtained through the above-described process is used to manufacture a moth-eye mold 100. The process of manufacturing the moth-eye mold 100 with the use of the mold base 10A, which will be described in the following with reference to FIG. 2(b) to FIG. 2(e), may be the same as, for example, the process of manufacturing the comparative example moth-eye mold 200 with the use of the mold base 10A'.

Figure 2:
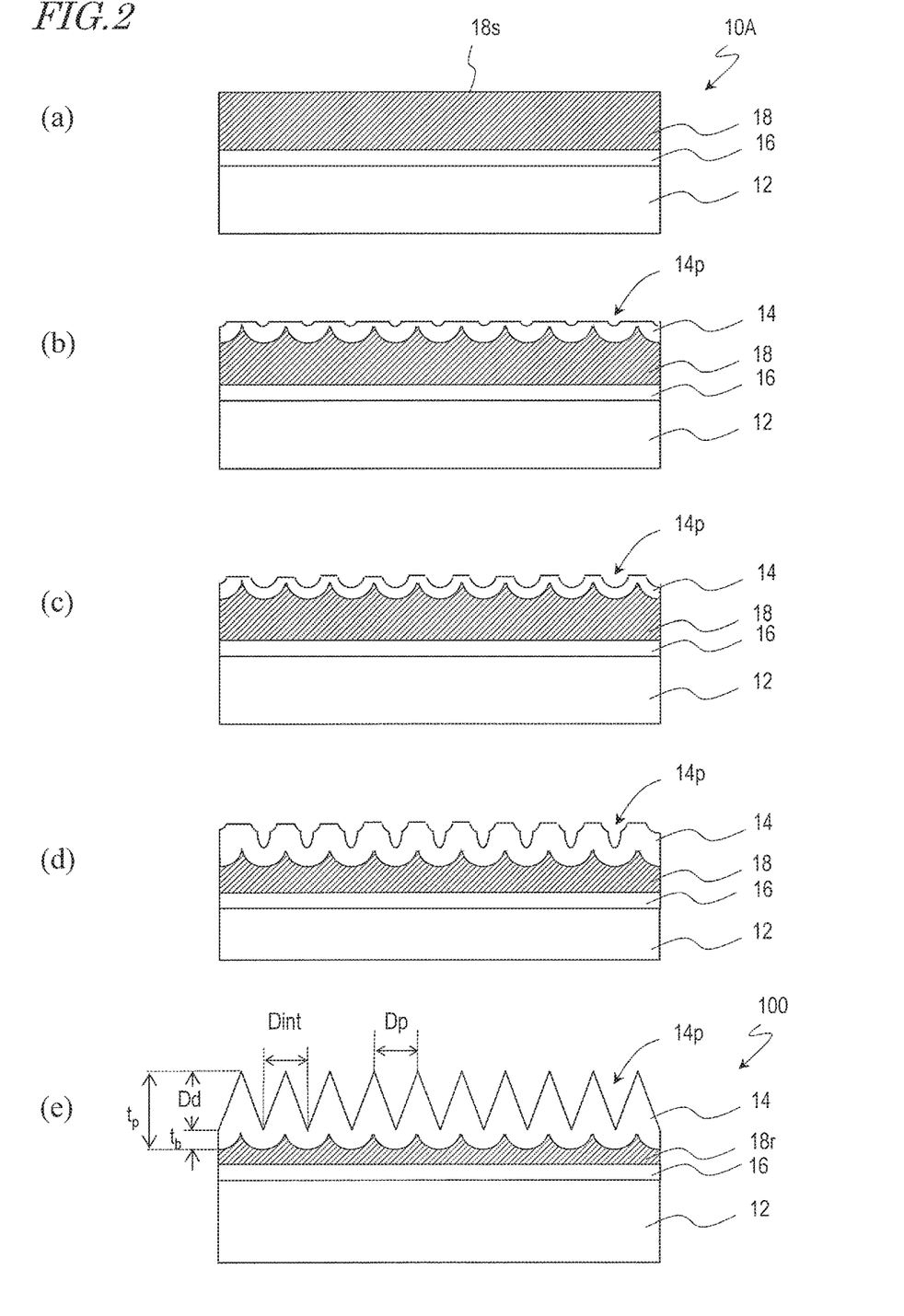
[FIG. 2] (a) to (e) are schematic cross-sectional views for illustrating a manufacturing method of the moth-eye mold 100 of Embodiment 1 of the present invention.

Then, a surface 18s of the aluminum alloy layer 18 is anodized to form a porous alumina layer 14 which has a plurality of recessed portions (micropores) 14p as shown in FIG. 2(b). The porous alumina layer 14 includes a porous layer which has the recessed portions 14p and a barrier layer (the base of the recessed portions (micropores) 14p). As known in the art, the interval between adjacent recessed portions 14p (the distance between the centers) is approximately twice the thickness of the barrier layer and is approximately proportional to the voltage that is applied during the anodization. This relationship also applies to the final porous alumina layer 14 shown in FIG. 2(e).

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum alloy layer 18 is anodized with an applied voltage of 80 V for 55 seconds using an oxalic acid aqueous solution (concentration: 0.3 mass %, solution temperature: 10° C.), whereby the porous alumina layer 14 is formed.

Then, the porous alumina layer 14 is brought into contact with a first etching solution such that a predetermined amount is etched away, whereby the opening of the recessed portions 14p is enlarged as shown in FIG. 2(c). By modifying the type and concentration of the first etching solution and the etching duration, the etching amount (i.e., the size and depth of the recessed portions 14p) can be controlled. The first etching solution used may be, for example, an aqueous solution of 1.0 mass % phosphoric acid, organic acid such as formic acid, acetic acid or citric acid, or sulfuric acid, or a chromic/phosphoric acid solution. For example, the etching is performed for 20 minutes using a phosphoric acid aqueous solution (10 mass %, 30° C.).

Then, the aluminum alloy layer 18 is again partially anodized such that the recessed portions 14p are grown in the depth direction and the thickness of the porous alumina layer 14 is increased as shown in FIG. 2(d). Here, the growth of the recessed portions 14p starts at the bottoms of the previously-formed recessed portions 14p, and accordingly, the lateral surfaces of the recessed portions 14p have stepped shapes.

Thereafter, when necessary, the porous alumina layer 14 may be brought into contact with the first etching solution to be further etched such that the pore diameter of the recessed portions 14p is further increased. The etching solution used in this step may preferably be the above-described first etching solution. Practically, the same etching bath may be used.

In this way, by alternately repeating the anodization step and the etching step as described above through multiple cycles (e.g., 5 cycles: including 5 anodization cycles and 4 etching cycles), the moth-eye mold 100 that includes the porous alumina layer 14 which has the inverted moth-eye structure is obtained as shown in FIG. 2(e). Since the process is ended with the anodization step, the recessed portions 14p have pointed bottom portion. That is, the resultant mold enables formation of raised portions with pointed tip ends.

The porous alumina layer 14 (thickness: $t_p$) shown in FIG. 2(e) includes a porous layer (whose thickness is equivalent to the depth $D_d$ of the recessed portions 14p) and a barrier layer (thickness: $t_b$). Since the porous alumina layer 14 has a structure obtained by inverting the moth-eye structure of the antireflection film 32, corresponding parameters which define the dimensions may sometimes be designated by the same symbols.

The recessed portions 14p of the porous alumina layer 14 may have, for example, a conical shape and may have a stepped lateral surface. It is preferred that the two-dimensional size of the recessed portions 14p (the diameter of a circle equivalent to the area of the recessed portions 14p when viewed in a normal direction of the surface), $D_p$, is more than 20 run and less than 500 nm, and the depth of the recessed portions 14p, $D_d$, is not less than 50 nm and less than 1000 nm (1 μm). It is also preferred that the bottom portion of the recessed portions 14p is acute (with the deepest part of the bottom portion being pointed). When the recessed portions 14p are in a densely packed arrangement, assuming that the shape of the recessed portions 14p when viewed in a normal direction of the porous alumina layer 14 is a circle, adjacent circles overlap each other, and a saddle portion is formed between adjacent ones of the recessed portions 14p. Note that, when the generally-conical recessed portions 14p adjoin one another so as to form saddle portions, the two-dimensional size of the recessed portions 14p, $D_p$, is equal to the adjoining distance Dint. The thickness of the porous alumina layer 14, $t_p$, is not more than about 1 μm.

Under the porous alumina layer 14 shown in FIG. 2(e), there is an aluminum remnant layer 18r. The aluminum remnant layer 18r is part of the aluminum alloy layer 18 which has not been anodized. When necessary, the aluminum alloy layer 18 may be substantially thoroughly anodized such that the aluminum remnant layer 18r is not present. For example, when the inorganic underlayer 16 has a small thickness, it is possible to readily supply an electric current from the aluminum base 12 side.

The manufacturing method of the moth-eye mold illustrated herein enables manufacture of a mold which is for production of antireflection films disclosed in Patent Documents 2 to 5. Since an antireflection film used in a high-definition display panel is required to have high uniformity, selection of the material of the aluminum base, specular working of the aluminum base, and control of the purity and components of the aluminum film are preferably carried out as described above. Note that, however, a mold of an embodiment of the present invention is not limited to this example but is widely applicable to production of a film whose surface has a moth-eye structure. When producing a film which is not required to have high uniformity, the above-described mold manufacturing method can be simplified.

According to the above-described mold manufacturing method, a mold in which the regularity of the arrangement of the recessed portions is low, and which is suitable to production of an antireflection film, can be manufactured. A mold for formation of a moth-eye structure which has regularly-arranged raised portions can be manufactured, for example, as described in the following section.

For example, after formation of a porous alumina layer having a thickness of about 0.1 μm to 0.3 μm, the formed porous alumina layer is removed by etching, and then, anodization may be performed under the above-described conditions for formation of the porous alumina layer. The porous alumina layer that has a thickness of 0.1 μm to 0.3 μm is realized by appropriately controlling the anodization duration. When a relatively thick porous alumina layer is thus formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a chromic/phosphoric acid solution is preferred. Although continuing the etching for a long period of time sometimes causes galvanic corrosion, the chromic/phosphoric acid solution has the effect of suppressing galvanic corrosion.

Mold bases of Example 1-1 to Example 1-3 and Comparative Example 1 specified in Table 1 shown below were manufactured. Each of the mold bases will be described below.

TABLE 1

| sample name | surface protection layer | thickness of surface protection layer (μm) | etching duration (min) | temperature of etching solution (° C.) | number of attached objects (before etching) | number of attached objects (out of 20, after etching) |
| --- | --- | --- | --- | --- | --- | --- |
| Example 1-1 | $Al_xO_y$ | 0.6 | 100 | 30 | 20 or more | 2 |
| Example 1-2 | $Al_xO_y$ | 0.6 | 150 | 30 | 20 or more | 0 |
| Example 1-3 | $Al_xO_y$ | 0.6 | 300 | 5 | 20 or more | 1 |
| Comparative Example 1 | none | — | 100 | 30 | 20 or more | 20 |

Example 1-1

An aluminum base 12 in the shape of a hollow cylinder (tube) with the outside diameter of 300 mm and the length of 300 mm was provided. The surface of the aluminum base 12 was washed with a solvent and, thereafter, $Ta_2O_5$ was deposited on the surface of the aluminum base 12 by sputtering, whereby a 200 nm thick inorganic underlayer 16 was formed. The sputtering conditions were as follows. The vacuum degree of the background was $6\times10^{-4}$ Pa. The sputtering gas was an Ar gas. The reactive gas was an oxygen gas. The vacuum degree during sputtering was $4\times10^{-1}$ Pa.

Then, an alloy containing aluminum is deposited on the inorganic underlayer 16, whereby a 1 μm thick aluminum alloy layer 18 was formed. The aluminum alloy layer 18 was made of aluminum whose purity was not less than 99.99 mass %. The sputtering conditions were as follows. The sputtering gas was an Ar gas. The reactive gas was a nitrogen gas. The vacuum degree during sputtering was $2.5\times10^{-1}$ Pa.

Then, sputtering was performed with a target material which was the same as the target material of the aluminum alloy layer 18 and an oxygen gas introduced into the chamber 90 such that a 0.6 μm (600 nm) thick surface protection layer 20 was formed. The sputtering conditions were as follows. The sputtering gas was an Ar gas. The reactive gas was an oxygen gas. The flow rate ratio between the Ar gas and the oxygen gas was 3:1. The vacuum degree during sputtering was $6.5 \times 10^{-1}$ Pa. The inorganic underlayer 16, the aluminum alloy layer 18 and the surface protection layer 20 were all formed in the same chamber 90.

Thereafter, the mold base 10B was taken out from the chamber 90. At the surface of the mold base 10B, 20 or more attached objects 210 were counted, and 20 out of the counted attached objects were marked. The counting of the attached objects 210 was performed using an inspection device for moth-eye molds. The inspection device for moth-eye molds includes an optical microscope for observing the surface of a moth-eye mold and a jig for determining the position of observation with the optical microscope. The counted attached objects 210 had a generally circular shape when viewed in a direction normal to the surface of the mold base 10B and had a diameter of not less than 20 μm.

Then, etching of the surface protection layer 20 was performed for 100 minutes using a phosphoric acid aqueous solution (1 mol/L, 30° C.) as the etching solution. The thickness of the aluminum alloy layer 18 after the etching was 0.97 μm.

Thereafter, the mold base was washed with water and dried. As a result, the mold base 10A of Example 1-1 was manufactured. Of the 20 attached objects 210 marked before the etching, the number of attached objects remaining on the surface of the mold base 10A was counted. As seen from Table 1 shown above, almost all the attached objects 210 were removed by the etching.

Comparative Example 1

The mold base manufacturing method of Comparative Example 1 is different from the above-described mold base manufacturing method of Example 1-1 in that the surface protection layer 20 was not formed. The attached objects 210 were counted before and after the etching in the same way as in Example 1-1. As seen from Table 1 shown above, the attached objects 210 were not removed.

Example 1-2

In Example 1-2, the thickness of the aluminum alloy layer 18 was 1.2 μm, while it was 1 μm in Example 1-1. In Example 1-2, the etching duration was 150 minutes, while it was 100 minutes in Example 1-1. It was found that such a long etching duration can contribute to effective removal of the attached objects 210. The thickness of the aluminum alloy layer 18 after the etching was 1.15 μm. Since in Example 1-2 the thickness of the aluminum alloy layer 18 as formed was greater than in Example 1-1, the thickness of the aluminum alloy layer 18 after the etching was also greater than in Example 1-1.

Example 1-3

In Example 1-3, the temperature of the etching solution was 5° C., while it was 30° C. in Example 1-1. In Example 1-3, the etching duration was 300 minutes, while it was 100 minutes in Example 1-1. It was confirmed that the attached objects 210 were removed even when the temperature of the etching solution was low. When the etching solution was an aqueous solution, there is a probability that the etching solution solidifies at a temperature lower than 0° C. The temperature of the etching solution is preferably not less than 3° C.

Embodiment 2

The mold manufacturing method of Embodiment 2 of the present invention is different from the mold manufacturing method of Embodiment 1 in that the mold manufacturing method of Embodiment 2 does not include the step of bringing the surface protection layer into contact with the second etching solution, thereby removing the surface protection layer. The mold manufacturing method of Embodiment 2 of the present invention may be the same as the mold manufacturing method of Embodiment 1 except that the mold manufacturing method of Embodiment 2 does not include the step of bringing the surface protection layer into contact with the second etching solution, thereby removing the surface protection layer.

In the mold manufacturing method of Embodiment 2, the mold base 10B shown in FIG. 1(*c*) is used to manufacture a moth-eye mold, and the anodization step and the etching step are performed under the conditions described with reference to FIG. 2(*a*) to FIG. 2(*e*), whereby recessed portions 14p are formed. Herein, for example, the first etching duration is longer than in the mold manufacturing method of Embodiment 1. Thus, the opening of the recessed portions 14p is increased, and the surface protection layer 20 can also be removed. When the surface protection layer 20 is removed, the attached objects 210 at the surface of the surface protection layer 20 can also be removed.

According to the mold manufacturing method of Embodiment 2 of the present invention, the surface protection layer is formed on the aluminum alloy layer, and formation of the surface protection layer is performed in the same chamber as that used for formation of the aluminum alloy layer, and therefore, occurrence of attached objects which are in direct contact with the aluminum alloy layer can be suppressed. Since attached objects occur on the surface protection layer that has a different composition from that of the aluminum alloy layer, the attached objects can be easily removed. The decrease in the production yield of a film produced with the use of the mold can be suppressed.

According to the mold manufacturing method of Embodiment 2, it is not necessary to provide two types of etching solutions and/or etching baths. Therefore, occurrence of attached objects can be suppressed without increasing the manufacturing steps.

It is preferred that the surface protection layer 20 of the mold base 10B is, for example, an aluminum oxide ($Al_2O_3$). By anodizing the surface of the mold base 10B, the aluminum alloy layer 18 is anodized, and a porous alumina layer 14 is formed from the surface protection layer 20 and the aluminum alloy layer 18. Here, the surface protection layer 20 is insulative and, therefore, the attached object 210 at the surface of the surface protection layer 20 is not anodized. The etching for removal of the surface protection layer 20 is performed for, for example, 30 minutes using a phosphoric acid aqueous solution (1 mol/L, 30° C.). The thickness of the surface protection layer 20 is, for example, 100 nm to 300 nm. From the viewpoint of ensuring insulation between the aluminum alloy layer 18 and the attached object 210, it is preferred that the thickness of the surface protection layer 20 is, for example, not less than 1 nm. From the viewpoint of reducing the time required for the etching for removal of the attached object 210, it is preferred that the thickness of the surface protection layer 20 is, for example, not more than 500 nm.

In the mold manufacturing method of Embodiment 2, after the mold base 10B shown in FIG. 1(c) is provided for manufacture of a moth-eye mold, the step of washing the surface of the surface protection layer 20 may be further performed before the anodization step and the etching step illustrated in FIG. 2(a) to FIG. 2(e). Since the attached object 210 is not in direct contact with the surface of the aluminum alloy layer 18, the attached object 210 can be removed by washing the surface of the surface protection layer 20. In the washing, for example, a two-fluid spray washing machine (manufactured by IMS DESIGN Kabushiki Kaisha) can be used.

In the foregoing, an antireflection film has been described as an example of the film whose surface has a moth-eye structure. However, a mold of an embodiment of the present invention is not limited to this example but is widely applicable to production of a film whose surface has a moth-eye structure.

In the foregoing, a moth-eye mold for formation of a moth-eye structure has been described as an example. However, a mold of an embodiment of the present invention is not limited to this example but is widely applicable to a mold for formation of, for example, raised portions with non-pointed tip ends (e.g., nanopillars). That is, the shape of micro recessed portions at the surface of a mold of an embodiment of the present invention is not limited to a generally conical shape but may be, for example, a generally circular truncated cone or may be a generally cylindrical shape. The bottom of the micro recessed portions is not limited to a pointed bottom but may be, for example, rounded or may be planar. The shape of the opening of the micro recessed portions is not limited to a circular shape but may be rectangular, for example. The plurality of micro recessed portions may be arranged regularly or may be arranged irregularly (randomly).

INDUSTRIAL APPLICABILITY

A mold of the present invention can be used in production of an antireflection film (antireflection surface) or the like.

REFERENCE SIGNS LIST

10', 10A, 10B mold base
12 metal base
14 porous alumina layer
14p recessed portion
16 inorganic underlayer
18 aluminum alloy layer
20 surface protection layer
90 chamber
100, 200 moth-eye mold
210 attached object

The invention claimed is:

1. A manufacturing method of a mold, the mold having at its surface a plurality of recessed portions whose two-dimensional size is not less than 10 nm and less than 500 nm when viewed in a direction normal to the surface, the method comprising:

(a) providing a mold base, step (a) including (a1) providing a metal base, (a2) forming an aluminum alloy layer on the metal base, and (a3) forming a surface protection layer on the aluminum alloy layer, wherein step (a2) and step (a3) are performed in a same chamber, and wherein step (a) further includes step (a4) bringing the surface protection layer into contact with an etching solution, thereby substantially thoroughly removing the surface protection layer and removing attached objects that have formed on the surface protection layer;

(b) partially anodizing the aluminum alloy layer, thereby forming a porous alumina layer having a plurality of minute recessed portions, a two-dimensional size of the plurality of minute recessed portions being smaller than the two dimensional size of the plurality of recessed portions; and (c) after step (b), bringing the porous alumina layer into contact with another etching solution different from the etching solution in step (a4), thereby enlarging the plurality of minute recessed portions of the porous alumina layer to form the mold, wherein an etching rate in the etching solution in step (a4) of the surface protection layer is higher than an etching rate in the etching solution in step (a4) of the aluminum alloy layer.

2. The method of claim 1, wherein
step (a2) includes forming the aluminum alloy layer by physical vapor deposition using a first source material which contains aluminum, and
step (a3) includes forming the surface protection layer by physical vapor deposition using a second source material which contains a material contained in the first source material.

3. The method of claim 2, wherein the first source material and the second source material are same materials.

4. The method of claim 1, wherein step (a3) includes forming the surface protection layer by physical vapor deposition which is performed with an oxygen gas or a nitrogen gas introduced into a chamber.

5. The method of claim 1, wherein the surface protection layer contains aluminum and either of oxygen or nitrogen.

6. The method of claim 1, wherein the etching rate in the etching solution in step (a4) of the surface protection layer is not less than 10 times the etching rate in the etching solution in step (a4) of the aluminum alloy layer.

7. The method of claim 1, wherein the etching solution in step (a4) and the other etching solution in step (c) contain a same acid.

8. The method of claim 1, wherein the etching solution in step (a4) and the other etching solution in step (c) are same etching solutions.

9. The method of claim 1, wherein step (a) further includes step (a5) after step (a1) and before step (a2), forming an inorganic underlayer on the metal base.

10. The method of claim 9, wherein step (a2), step (a3) and step (a5) are performed in a same chamber.

11. The method of claim 1, further comprising step (d) after step (c), further performing anodization to grow the plurality of minute recessed portions.

12. The method of claim 11, wherein step (c) and step (d) are repeated.

* * * * *